(12) United States Patent
Zhao et al.

(10) Patent No.: US 9,705,875 B2
(45) Date of Patent: Jul. 11, 2017

(54) DATA STORAGE SYSTEM AND METHOD FOR SECURITY INFORMATION INTERACTION

(75) Inventors: Wei Zhao, Shanghai (CN); Jingwen Xu, Shanghai (CN); Feng Shi, Shanghai (CN); Yang Gao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 131 days.

(21) Appl. No.: 14/235,781

(22) PCT Filed: Aug. 2, 2012

(86) PCT No.: PCT/CN2012/079562
§ 371 (c)(1),
(2), (4) Date: May 1, 2014

(87) PCT Pub. No.: WO2013/017093
PCT Pub. Date: Feb. 7, 2013

(65) Prior Publication Data
US 2014/0237569 A1 Aug. 21, 2014

(30) Foreign Application Priority Data
Aug. 2, 2011 (CN) .......................... 2011 1 0220050

(51) Int. Cl.
*H04L 29/06* (2006.01)
*G06F 21/34* (2013.01)
*G06F 21/30* (2013.01)
*G06F 21/31* (2013.01)
*G06F 21/78* (2013.01)

(52) U.S. Cl.
CPC .......... *H04L 63/083* (2013.01); *G06F 21/305* (2013.01); *G06F 21/31* (2013.01);
(Continued)

(58) Field of Classification Search
CPC ............ H04L 9/00; H04L 9/32–9/3297; H04L 63/04–63/0492; H04L 63/08–63/0892;
(Continued)

(56) References Cited

U.S. PATENT DOCUMENTS

2004/0103324 A1  5/2004  Band
2004/0133324 A1  7/2004  Yasui et al.
(Continued)

FOREIGN PATENT DOCUMENTS

CN       1898621 A      1/2007
CN     101084548      12/2007
(Continued)

OTHER PUBLICATIONS

European Search Report dated Feb. 6, 2015 (Application No. EP 12820499) (6 pages).

*Primary Examiner* — Ashok Patel
*Assistant Examiner* — Quazi Farooqui
(74) *Attorney, Agent, or Firm* — Blakely Sokoloff Taylor & Zafman LLP

(57) ABSTRACT

The present invention proposes a data storage system and method used for the security information interaction. Said data storage system used for the security information interaction comprises a security information storage device, an unlock password generating device and an unlock server. The data storage system and method used for the security information interaction disclosed in the present invention reduce the potential security risks due to the divulgement of unlock passwords, and reduce the complexity of the unlock process, as well as reduce the potential security risks existed in the generating and writing process of the unlock password on the whole.

9 Claims, 2 Drawing Sheets

(52) U.S. Cl.
CPC .............. *G06F 21/34* (2013.01); *G06F 21/78*
(2013.01); *H04L 63/0853* (2013.01); *G06F*
*2221/2105* (2013.01); *G06F 2221/2141*
(2013.01); *G06F 2221/2147* (2013.01)

(58) Field of Classification Search
CPC ...................... H04L 29/06; G06F 15/16; G06F
21/30–21/46; G06F 21/60–21/645; G06F
9/00; G06F 21/31; G06F 21/78; G06F
21/305; G06F 21/34; G06F 2221/2147;
G06F 2221/2141; G06F 2221/2105
USPC ........................................................ 726/1–8
See application file for complete search history.

(56) References Cited

U.S. PATENT DOCUMENTS

| | | | | |
|---|---|---|---|---|
| 2005/0198645 | A1* | 9/2005 | Marr | ...................... G06F 21/606 719/310 |
| 2006/0176146 | A1 | 8/2006 | Krishan et al. | |
| 2008/0209224 | A1* | 8/2008 | Lord | ...................... H04L 63/083 713/185 |
| 2008/0244734 | A1 | 10/2008 | Okaue | |
| 2010/0100726 | A1* | 4/2010 | Merrifield | ............... G06F 21/10 713/155 |
| 2010/0279675 | A1* | 11/2010 | Slack | .................... G06F 9/4843 455/419 |
| 2010/0281252 | A1* | 11/2010 | Steeves | ................. H04L 9/3213 713/155 |

FOREIGN PATENT DOCUMENTS

| | | |
|---|---|---|
| CN | 101496337 A | 7/2009 |
| CN | 101796525 | 8/2010 |
| CN | 101796525 A | 8/2010 |
| CN | 102082785 A | 6/2011 |
| JP | 2004145500 | 5/2004 |
| JP | 2007249507 | 9/2007 |

* cited by examiner

DATA STORAGE SYSTEM AND METHOD FOR SECURITY INFORMATION INTERACTION

FIELD OF THE INVENTION

The present invention relates to a data storage system and method, and more particularly, to a data storage system and method used for the security information interaction.

BACKGROUND

Nowadays, with the increasingly development of network technology and increasingly enrichment of business types of different fields (e.g. the internet-based financial transaction field), there is an increasingly growing demand for the data storage system and method used for the security information interaction, therefore, the security data storage system and method become more and more important.

Typically, the existing security data storage systems (for example, in the applications which adopt the authentication technology such as a digital certificate based on public key cryptography system, a dynamic password or the like, a USBKey is usually used to store the digital certificate and associated key pair) include the following two implementation approach: (1) both a user password and an unlock password are used in the security data storage system (including a security data storage device), said user password is used for authenticating the identity of the user of the security data storage device, and said unlock password is used for unlocking the security data storage device (when the number of times that the error user passwords are entered continuously reach a predetermined number of times, said security data storage device is locked automatically), so as to cause said user password to recovery to an initial state, wherein, the user password of said security data storage device is initialized by the manufacturer and can be reset by the user, whereas the unlock passwords are all the same (for example, the USBKeys belonging to the same batch have the same unlock passwords); (2) the initialization and reset of the user password are not supported (for example, the PIN code is not supported) in the security data storage system, i.e., once the security data storage device is locked, the user must use a new security data storage device (e.g. the USBKey) and re-download new security information data (such as the digital certificate).

However, the first implementation approach described above has the following problems: due to the unlock passwords are all the same, once the unlock password has been divulged, then any security data storage device can be unlocked, thus there exist largely potential security risks.

The second implementation approach described above has the following problems: the use cost of the user increases (for example, once the security data storage device is locked, a new security data storage device needs to be used), and the complexity of use is significantly increased (for example, to re-download new security information data).

Therefore, there exists the needs for providing a data storage system and method used for the security information interaction, which have the high degree of security and are convenient and easy to use.

SUMMARY OF THE INVENTION

In order to solve the problems presented in the existing technical solutions described above, the present invention proposes a data storage system and method used for the security information interaction.

The object of the present invention is realized through the following technical solutions:

A data storage system used for the security information interaction, said data storage system used for the security information interaction comprising:

a security information storage device for storing and providing the data information related to the security information interaction;

an unlock password generating device for generating the unlock password corresponding to said security information storage device based on original parameters extracted from said security information storage device, and writing the unlock password into said security information storage device; and an unlock server for generating the unlock password corresponding to said security information storage device based on original parameters acquired from said security information storage device when said security information storage device is locked, and using said unlock password to unlock said locked security information storage device.

In the solutions disclosed above, preferably, said original parameters are at least one factor being capable of uniquely identifying said security information storage device.

In the solutions disclosed above, preferably, said original parameters are the identifier of said security information storage device.

In the solutions disclosed above, preferably, said data information related to the security information interaction include an unlock password, a user password and business authentication data.

In the solutions disclosed above, preferably, said security information storage device further comprises:

a data communication interface for completing the data communication with external devices;

an unlock password initialization module for providing original parameters corresponding to said security information storage device in response to an original parameters extracting request message from said unlock password generating device, and storing the unlock password generated by the unlock password generating device into a data storage module;

an unlock module for providing original parameters corresponding to said security information storage device according to the original parameters extracting request message from said unlock server, and unlocking said security information storage device based on the unlock password in an unlock request message from said unlock server;

a locking module for locking said security information storage device when a predetermined condition is satisfied; and a data storage module for storing said data information related to the security information interaction.

In the solutions disclosed above, preferably, said security information storage device further comprises an information reset module. Said information reset module is used to initialize the predetermined items in said data information related to the security information interaction when said security information storage device is unlocked.

In the solutions disclosed above, preferably, said data communication interface is a USB interface.

In the solutions disclosed above, preferably, said unlock password generating device further comprises:

an original parameters extracting module for sending said original parameters extracting request message to said security information storage device, and transmitting the original parameters acquired from said security information storage device to a password generating module; and a password generating module for generating an unlock password corresponding to said security information storage device based on said original parameters and by means of invoking a first dynamic link library, and transmitting the generated unlock password to said security information storage device.

In the solutions disclosed above, preferably, said first dynamic link library is set by a service provider or the relevant third party.

In the solutions disclosed above, preferably, said unlock server further comprises:

an original parameters acquiring module for sending an original parameters extracting request message to said security information storage device, and transmitting the original parameters acquired from said security information storage device to an unlock password generating module;

an unlock password generating module for generating an unlock password corresponding to said security information storage device based on said original parameters and by means of invoking the second dynamic link library, and transmitting the generated unlock password to an unlock initiating module; and an unlock initiating module for configuring an unlock request message based on the generated unlock password, and transmitting said unlock request message to said security information storage device.

In the solutions disclosed above, preferably, said second dynamic link library is set by the manufacturer of said security information storage device.

In the solutions disclosed above, preferably, said security information storage device is a USBKey.

The object of the present invention can also be realized through the following technical solutions:

A data storage method used for the security information interaction, said data storage method used for the security information interaction comprising the following steps:

(A1) an unlock password generating device generating an unlock password corresponding to a security information storage device based on the original parameters extracted from said security information storage device, and writing the unlock password into said security information storage device;

(A2) an unlock server generating the unlock password corresponding to said security information storage device based on the original parameters acquired from said security information storage device when said security information storage device is locked, and using said unlock password to unlock said locked security information storage device;

(A3) said security information storage device communicating with a user terminal via a data communication interface when said security information storage device is in a non-locked state, so as to complete the interaction of the security information.

In the solutions disclosed above, preferably, said original parameters are at least one factor being capable of uniquely identifying said security information storage device.

In the solutions disclosed above, preferably, said original parameters are the identifier of said security information storage device.

In the solutions disclosed above, preferably, said security information is business authentication data.

In the solutions disclosed above, preferably, said data storage method used for the security information interaction further comprises:

(A4) locking said security information storage device when a predetermined condition is satisfied.

In the solutions disclosed above, preferably, said step (A2) further comprises: initializing predetermined items when said security information storage device is unlocked.

In the solutions disclosed above, preferably, said data communication interface is a USB interface.

In the solutions disclosed above, preferably, said step (A1) further comprises:

(B1) sending an original parameters extracting request message to said security information storage device, so as to acquire the original parameters from said security information storage device; and (B2) generating an unlock password corresponding to said security information storage device based on said original parameters and by means of invoking a first dynamic link library, and transmitting the generated unlock password to said security information storage device.

In the solutions disclosed above, preferably, said first dynamic link library is set by a service provider or the relevant third party.

In the solutions disclosed above, preferably, said step (A2) further comprises:

(C1) sending an original parameters extracting request message to said security information storage device, so as to acquire the original parameters from said security information storage device;

(C2) generating an unlock password corresponding to said security information storage device based on said original parameters and by menas of invoking the second dynamic link library; and (C3) configuring an unlock request message based on the generated unlock password, and transmitting said unlock request message to said security information storage device.

In the solutions disclosed above, preferably, said second dynamic link library is set by the manufacturer of said security information storage device.

In the solutions disclosed above, preferably, said security information storage device is a USBKey.

The data storage system and method used for the security information interaction disclosed in the present invention have the following advantages: (1) since different security information storage devices have different unlock passwords, the potential security risks due to the divulgement of the unlock passwords are reduced; (2) the complexity of the unlock process is reduced, and the maintain cost of the user for the security information storage device is reduced at the same time; (3) since said first dynamic link library and said second dynamic link library are set by different providers, the details (e.g., which key algorithm is adopted) of generating and writing the unlock password are not visible to the external, thereby further reducing the potential security risks existed in the generating and writing process of the unlock password on the whole.

BRIEF DESCRIPTION OF THE DRAWINGS

The technical features and advantages of the present invention will be better appreciated by one skilled in the art in conjunction with the accompanying drawings, in which.

DETAILED DESCRIPTION OF THE INVENTION

Figure 1:
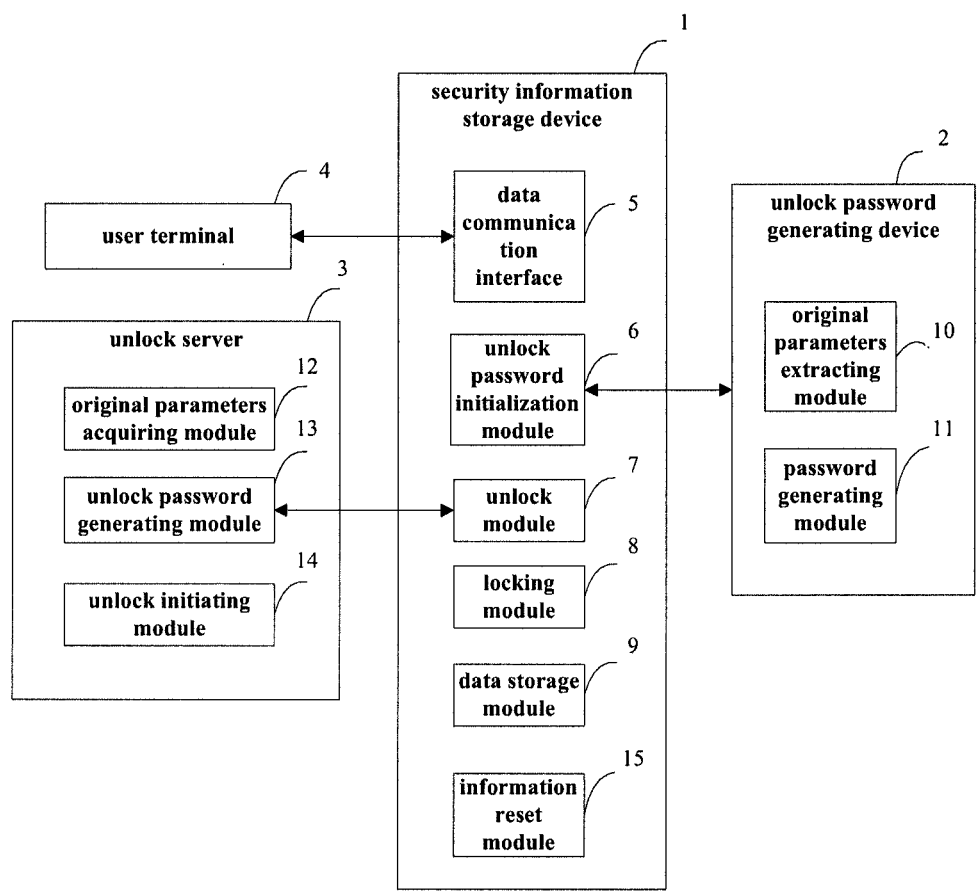
FIG. 1 is a schematic structure diagram of the data storage system used for the security information interaction according to the embodiment of the present invention.

FIG. 1 is a schematic structure diagram of the data storage system used for the security information interaction according to the embodiment of the present invention. As shown in FIG. 1, the data storage system used for the security information interaction disclosed in the present invention comprises a security information storage device 1, an unlock password generating device 2 and an unlock server 3. Said security information storage device 1 is used to store and provide the data information related to the security information interaction. Said unlock password generating device 2 is used to generate the unlock password corresponding to said security information storage device 1 based on the original parameters extracted from said security information storage device 1, and to write said unlock password into said security information storage device 1. Said unlock server 3 is used to generate the unlock password corresponding to said security information storage device 1 based on the original parameters acquired from said security information storage device 1 when said security information storage device 1 is locked, and to use said unlock password to unlock said locked security information storage device 1.

Exemplarily, said original parameters are at least one factor being capable of uniquely identifying said security information storage device 1.

Exemplarily, said original parameters are the identifier (i.e., ID) of said security information storage device 1.

Exemplarily, said data information related to the security information interaction include an unlock password, a user password and business authentication data (e.g. a digital certificate, a dynamic password or the like).

As shown in FIG. 1, preferably, in the data storage system used for the security information interaction disclosed in the present invention, said security information storage device 1 further comprises a data communication interface 5, an unlock password initialization module 6, an unlock module 7, a locking module 8 and a data storage module 9. Said data communication interface 5 is used to complete the data communication with external devices. Said unlock password initialization module 6 is used to provide the original parameters corresponding to said security information storage device 1 in response to an original parameters extracting request message from said unlock password generating device 2, and to store the generated unlock password from said unlock password generating device 2 into said data storage module 9. Said unlock module 7 is used to provide the original parameters corresponding to said security information storage device 1 according to an original parameters extracting request message from said unlock server 3, and to unlock said security information storage device 1 based on the unlock password in the unlock request message from said unlock server 3. Said locking module 8 is used to lock said security information storage device 1 when a predetermined condition is satisfied (exemplarily, said predetermined condition is that the number of times that the error user passwords are entered continuously reaches a predetermined number of times). Said data storage module 9 is used to store said data information related to the security information interaction.

Optionally, in the data storage system used for the security information interaction disclosed in the present invention, said security information storage device 1 further comprises an information reset module 15. Said information reset module 15 is used to initialize the predetermined items in said data information related to the security information interaction when said security information storage device 1 is unlocked (exemplarily, said predetermined items are user passwords).

Preferably, in the data storage system used for the security information interaction disclosed in the present invention, said data communication interface 5 is a USB interface.

As shown in FIG. 1, preferably, in the data storage system used for the security information interaction disclosed in the present invention, said unlock password generating device 2 further comprises an original parameters extracting module 10 and a password generating module 11. Said original parameters extracting module 10 is used to send said original parameters extracting request message to said security information storage device 1, and to transmit the original parameters acquired from said security information storage device 1 to said password generating module 11. Said password generating module 11 is used to generate an unlock password corresponding to said security information storage device 1 based on said original parameters and by means of invoking a first dynamic link library (key algorithm dynamic link library DLL1), and to transmit the generated unlock password to said security information storage device 1.

Preferably, in the data storage system used for the security information interaction disclosed in the present invention, said first dynamic link library is set by a service provider (e.g. a bank) or the relevant third party (i.e., said first dynamic link library is provided by a service provider or the relevant third party).

As shown in FIG. 1, preferably, in the data storage system used for the security information interaction disclosed in the present invention, said unlock server 3 further comprises an original parameters acquiring module 12, an unlock password generating module 13 and an unlock initiating module 14. Said original parameters acquiring module 12 is used to send an original parameters extracting request message to said security information storage device 1, and to transmit the original parameters acquired from said security information storage device 1 to said unlock password generating module 13. Said unlock password generating module 13 is used to generate an unlock password corresponding to said security information storage device 1 based on said original parameters and by means of invoking the second dynamic link library (an unlock dynamic link library DLL2), and to transmit the generated unlock password to said unlock initiating module 14. Said unlock initiating module 14 is used to configure an unlock request message based on said generated unlock password, and to transmit said unlock request message to said security information storage device 1.

Preferably, in the data storage system used for the security information interaction disclosed in the present invention, said second dynamic link library is set by the manufacturer of said security information storage device 1 (i.e., said second dynamic link library is provided by the manufacturer of said security information storage device 1).

As shown in FIG. 1, exemplarily, in the data storage system used for the security information interaction disclosed in the present invention, said external devices include a user terminal 4, the unlock password generating device 2 and the unlock server 3.

Exemplarily, in the data storage system used for the security information interaction disclosed in the present invention, said security information storage device 1 is a USBKey.

As shown in FIG. 1, the basic operational principle of the data storage system used for the security information interaction disclosed in the present invention is as follows: the manufacturer of said security information storage device 1 invokes said first dynamic link library based on the original parameters extracted from said security information storage device 1 and by means of using the unlock password generating device 2, so as to generate an unlock password corresponding to said security information storage device 1, and to write said unlock password into said security information storage device 1; when said security information storage device 1 is locked (for example, the number of times that the error user passwords are entered continuously reaches a predetermined number of times), said unlock server 3 invokes said second dynamic link library based on the original parameters acquired from said security information storage device 1, so as to generate an unlock password corresponding to said security information storage device 1, and to use said unlock password to unlock said locked security information storage device 1; when said security information storage device 1 is in a non-locked state, said security information storage device 1 can communicate with said user terminal 4 via said data communication interface 5, so as to complete the interaction of the security information related to businesses (for example, the authentication of the security data in the financial transaction).

Figure 2:
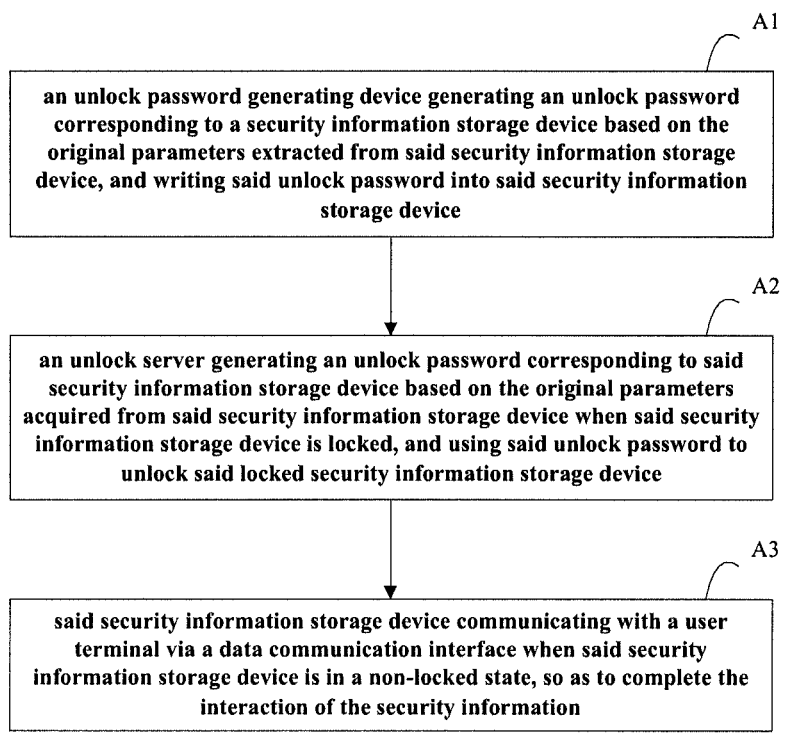
FIG. 2 is a flow diagram of the data storage method used for the security information interaction according to the embodiment of the present invention.

FIG. 2 is a flow diagram of the data storage method used for the security information interaction according to the embodiment of the present invention. As shown in FIG. 2, the data storage method used for the security information interaction disclosed in the present invention comprises the following steps: (A1) an unlock password generating device generating an unlock password corresponding to a security information storage device based on the original parameters extracted from said security information storage device, and writing said unlock password into said security information storage device; (A2) an unlock server generating an unlock password corresponding to said security information storage device based on the original parameters acquired from said security information storage device when said security information storage device is locked, and using said unlock password to unlock said locked security information storage device; (A3) said security information storage device communicating with a user terminal via a data communication interface when said security information storage device is in a non-locked state, so as to complete the interaction of the security information (for example, the authentication of the security data in the financial transaction).

Exemplarily, in the data storage method used for the security information interaction disclosed in the present invention, said original parameters are at least one factor being capable of uniquely identifying said security information storage device.

Exemplarily, in the data storage method used for the security information interaction disclosed in the present invention, said original parameters are the identifier (i.e., ID) of said security information storage device.

Exemplarily, in the data storage method used for the security information interaction disclosed in the present invention, said security information is business authentication data (e.g. a digital certificate, a dynamic password or the like).

As shown in FIG. 2, preferably, the data storage method used for the security information interaction disclosed in the present invention further comprises: (A4) locking said security information storage device when a predetermined condition is satisfied (exemplarily, said predetermined condition is that the number of times that the error user passwords are entered continuously reaches a predetermined number of times).

As shown in FIG. 2, preferably, in the data storage method used for the security information interaction disclosed in the present invention, said step (A2) further comprises: initializing the predetermined items when said security information storage device is unlocked (exemplarily, said predetermined items are user passwords).

Preferably, in the data storage method used for the security information interaction disclosed in the present invention, said data communication interface is a USB interface.

As shown in FIG. 2, preferably, in the data storage method used for the security information interaction disclosed in the present invention, said step (A1) further comprises: (B1) sending an original parameters extracting request message to said security information storage device, so as to acquire the original parameters from said security information storage device; and (B2) generating an unlock password corresponding to said security information storage device based on said original parameters and by means of invoking the first dynamic link library (key algorithm dynamic link library DLL1), and transmitting the generated unlock password to said security information storage device.

Preferably, in the data storage method used for the security information interaction disclosed in the present invention, said first dynamic link library is set by a service provider (e.g. a bank) or the relevant third party (i.e., said first dynamic link library is provided by a service provider or the relevant third party).

As shown in FIG. 2, preferably, in the data storage method used for the security information interaction disclosed in the present invention, said step (A2) further comprises: (C1) sending an original parameters extracting request message to said security information storage device, so as to acquire the original parameters from said security information storage device; (C2) generating an unlock password corresponding to said security information storage device based on said original parameters and by means of invoking the second dynamic link library (an unlock dynamic link library DLL2); and (C3) configuring an unlock request message based on the generated unlock password, and transmitting said unlock request message to said security information storage device.

Preferably, in the data storage method used for the security information interaction disclosed in the present invention, said second dynamic link library is set by the manufacturer of said security information storage device (i.e., said second dynamic link library is provided by the manufacturer of said security information storage device 1).

Exemplarily, in the data storage method used for the security information interaction disclosed in the present invention, said security information storage device is a USBKey.

Although the present invention is described by way of the preferred embodiments mentioned above, but its realization form is not limited to aforementioned embodiments. It should be recognized that various changes and modifications can be made to the present invention by one skilled in the art without departing from the spirit and scope of the invention.

What is claimed is:
1. A data storage system used for security information interaction, said data storage system used for security information interaction comprising:
   a USB key security information storage device for storing and providing data information related to the security information interaction;

an unlock password generating device for generating an unlock password corresponding to said USB key security information storage device based on original parameters extracted from said USB key security information storage device, and writing said unlock password into said USB key security information storage device, wherein said unlock password generating device further comprises:

an original parameters extracting module for sending a password generation original parameters extracting request message to said USB key security information storage device, and transmitting the original parameters acquired from said USB key security information storage device to a password generating module; and said password generating module for generating an unlock password corresponding to said USB key security information storage device based on said original parameters, and transmitting the generated unlock password to said USB key security information storage device, wherein said password generating module generates said unlock password corresponding to said USB key security information storage device by invoking a first dynamic link library and a second dynamic link library, wherein said first dynamic link library and said second dynamic link library are set by different providers; and an unlock server for generating the unlock password corresponding to said USB key security information storage device based on the original parameters acquired from said USB key security information storage device when said USB key security information storage device is locked, and using said unlock password to unlock said locked USB key security information storage device, wherein said unlock server further comprises:

an original parameters acquiring module for sending an unlock password generation original parameters extracting request message to said USB key security information storage device, and transmitting the original parameters acquired from said USB key security information storage device in response to said unlock password generation original parameters extracting request message to an unlock password generating module;

said unlock password generating module for generating an unlock password corresponding to said USB key security information storage device based on said original parameters and transmitting the generated unlock password to an unlock initiating module; and said unlock initiating module for configuring an unlock request message based on the generated unlock password, and transmitting said unlock request message to said USB key security information storage device, wherein said USB key security information storage device further comprises:

a data communication interface for completing the data communication with external devices;

an unlock password initialization module for providing the original parameters corresponding to said USB key security information storage device in response to said original parameters extracting request message from said unlock password generating device, and storing the generated unlock password from the unlock password generating device into a data storage module;

an unlock module for providing the original parameters corresponding to said USB key security information storage device according to said original parameters extracting request message from said unlock server, and unlocking said USB key security information storage device based on the unlock password in the unlock request message from said unlock server;

a locking module for locking said USB key security information storage device when a predetermined condition is satisfied, wherein said predetermined condition is a failure to provide a correct unlock password.

2. The data storage system used for the security information interaction as claimed in claim 1, wherein said original parameters are at least one factor for uniquely identifying said USB key security information storage device.

3. The data storage system used for the security information interaction as claimed in claim 2, wherein said original parameters are the identifier of said USB key security information storage device.

4. The data storage system used for the security information interaction as claimed in claim 3, wherein said data information related to the security information interaction include an unlock password, a user password and business authentication data.

5. The data storage system used for the security information interaction as claimed in claim 4, wherein said USB key security information storage device further comprises:

a data storage module for storing said data information related to the security information interaction.

6. The data storage system used for the security information interaction as claimed in claim 5, wherein said USB key security information storage device further comprises an information reset module, said information reset module is used to initialize the predetermined items in said data information related to the security information interaction when said USB key security information storage device is unlocked.

7. The data storage system used for the security information interaction as claimed in claim 6, wherein said data communication interface is a USB interface.

8. The data storage system used for the security information interaction as claimed in claim 1, wherein said first dynamic link library is set by a service provider or the relevant third party.

9. The data storage system used for the security information interaction as claimed in claim 1, wherein said second dynamic link library is set by the manufacturer of said USB key security information storage device.

\* \* \* \* \*